B. A. PETERSON.
BOBBIN HANDLING APPARATUS.
APPLICATION FILED JAN. 6, 1912.
1,063,588.
Patented June 3, 1913.
6 SHEETS—SHEET 2.
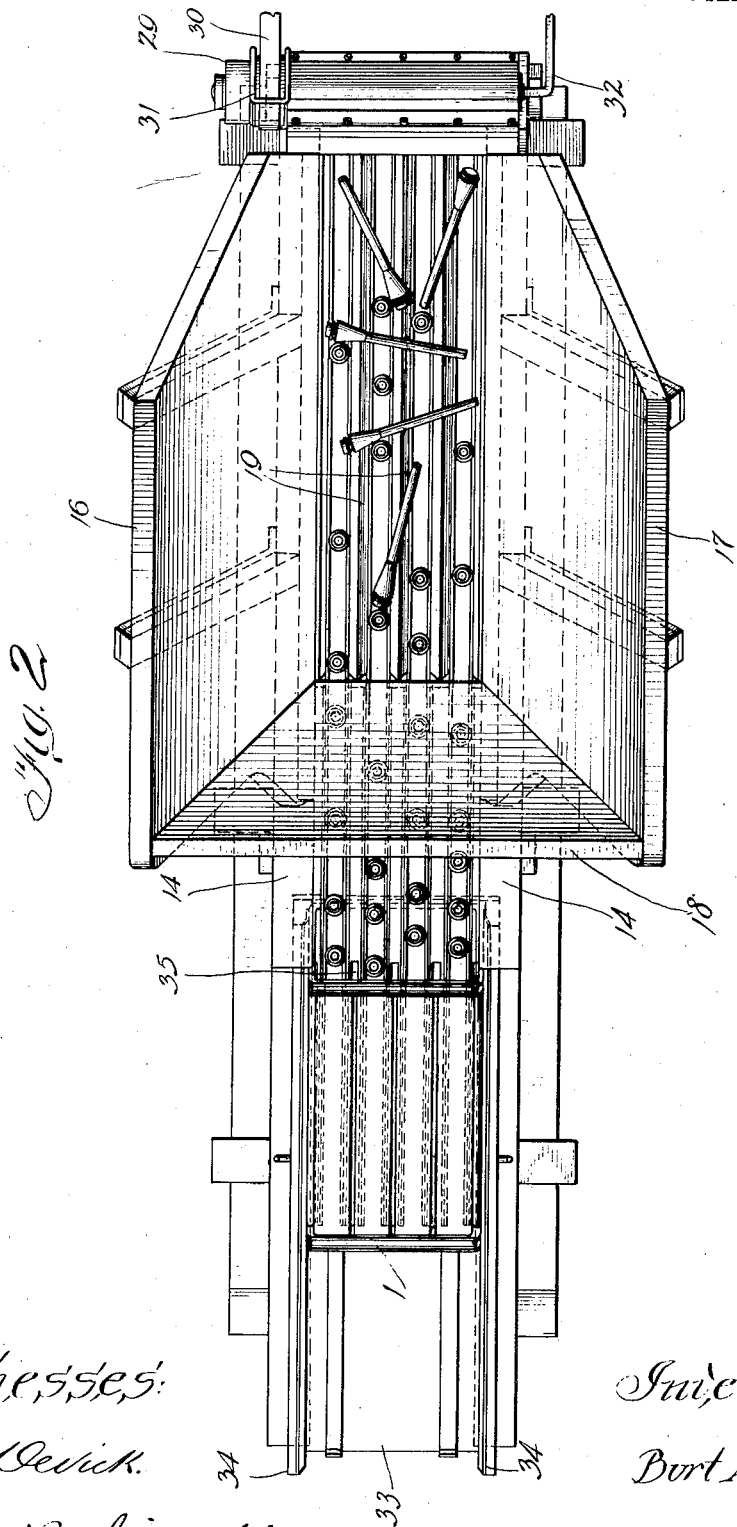
Witnesses:
J. C. Devick.
George L. Chindahl.
Inventor:
Bert A. Peterson
By Luther L. Miller
Atty.

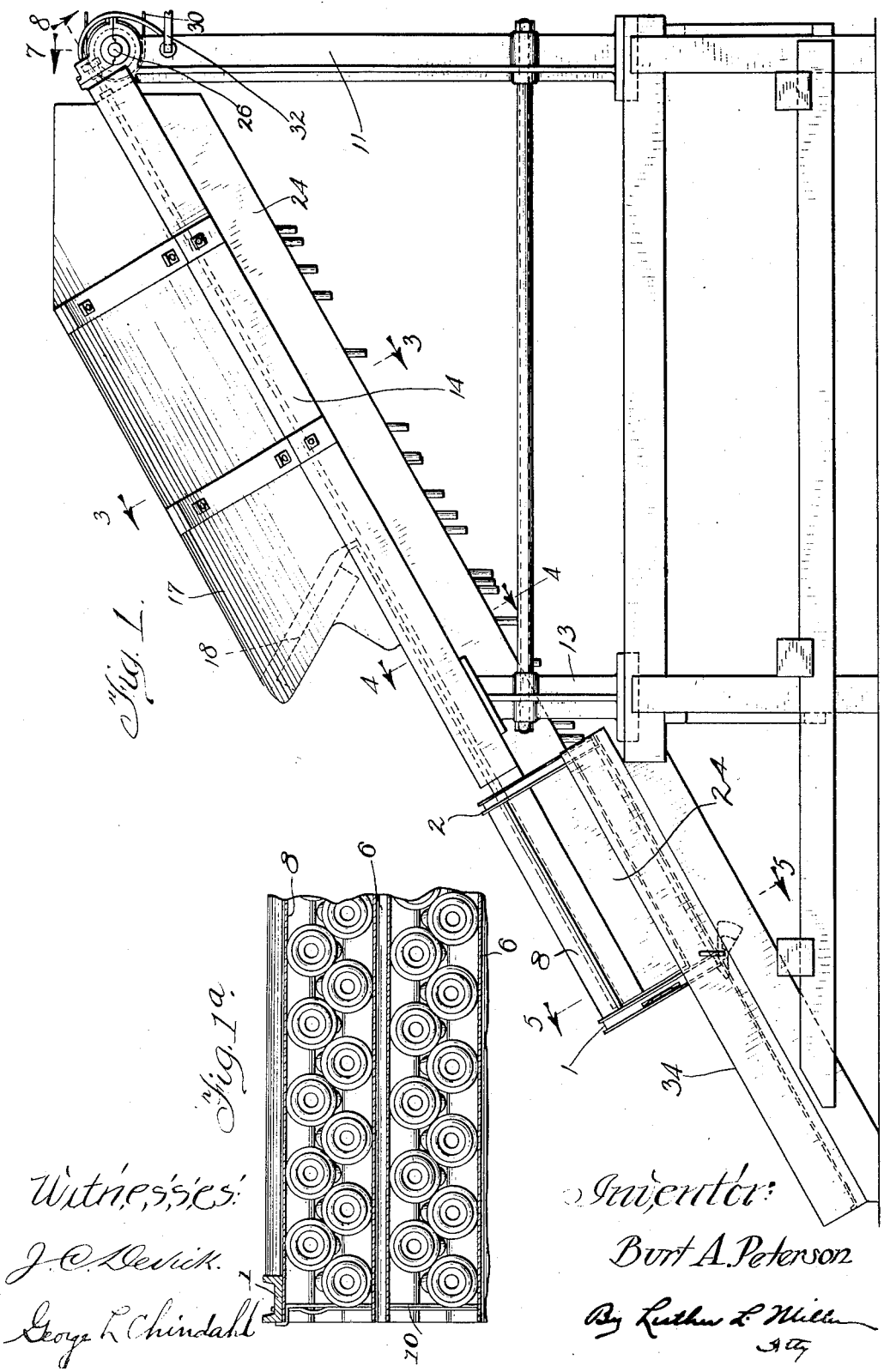

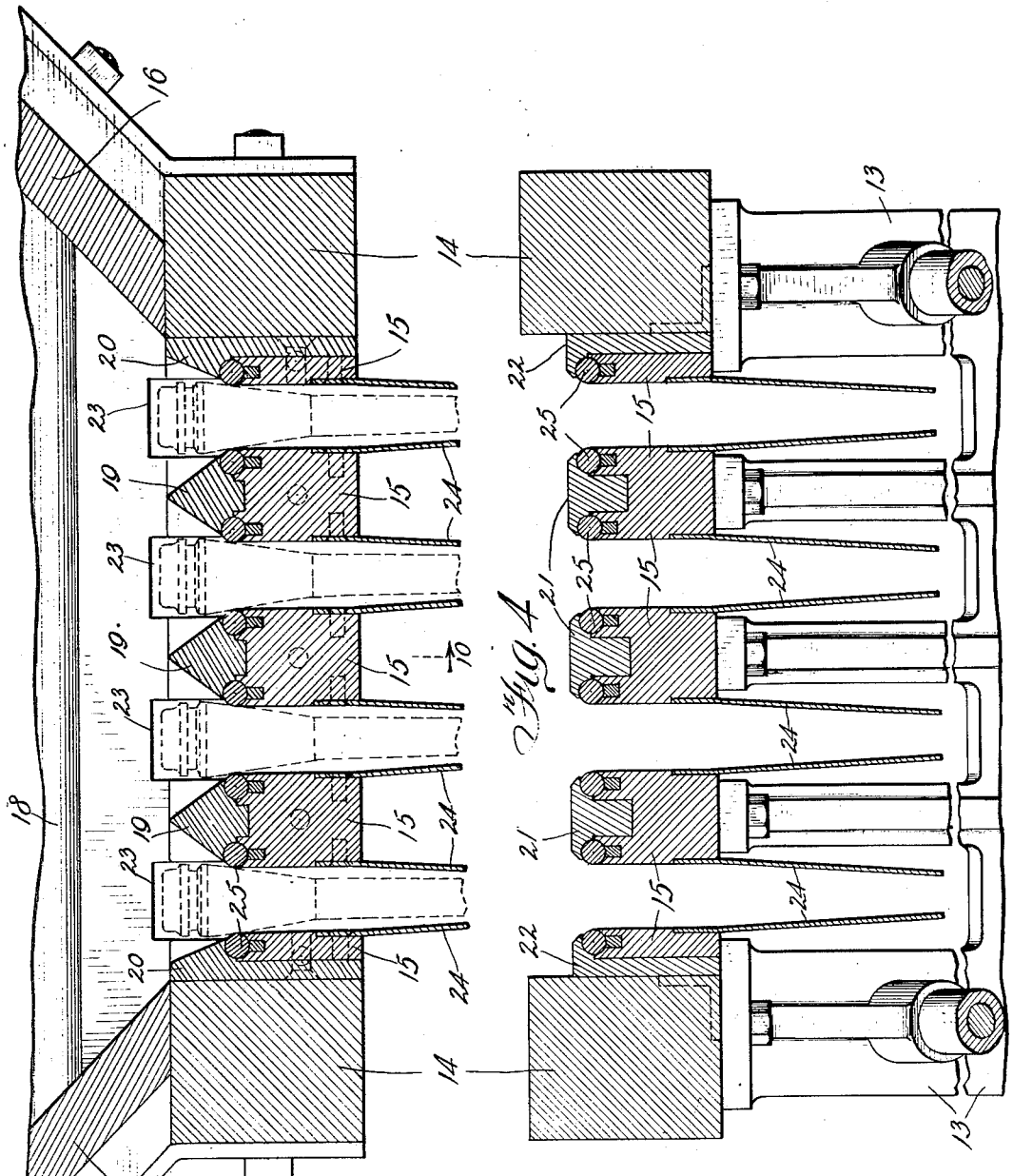

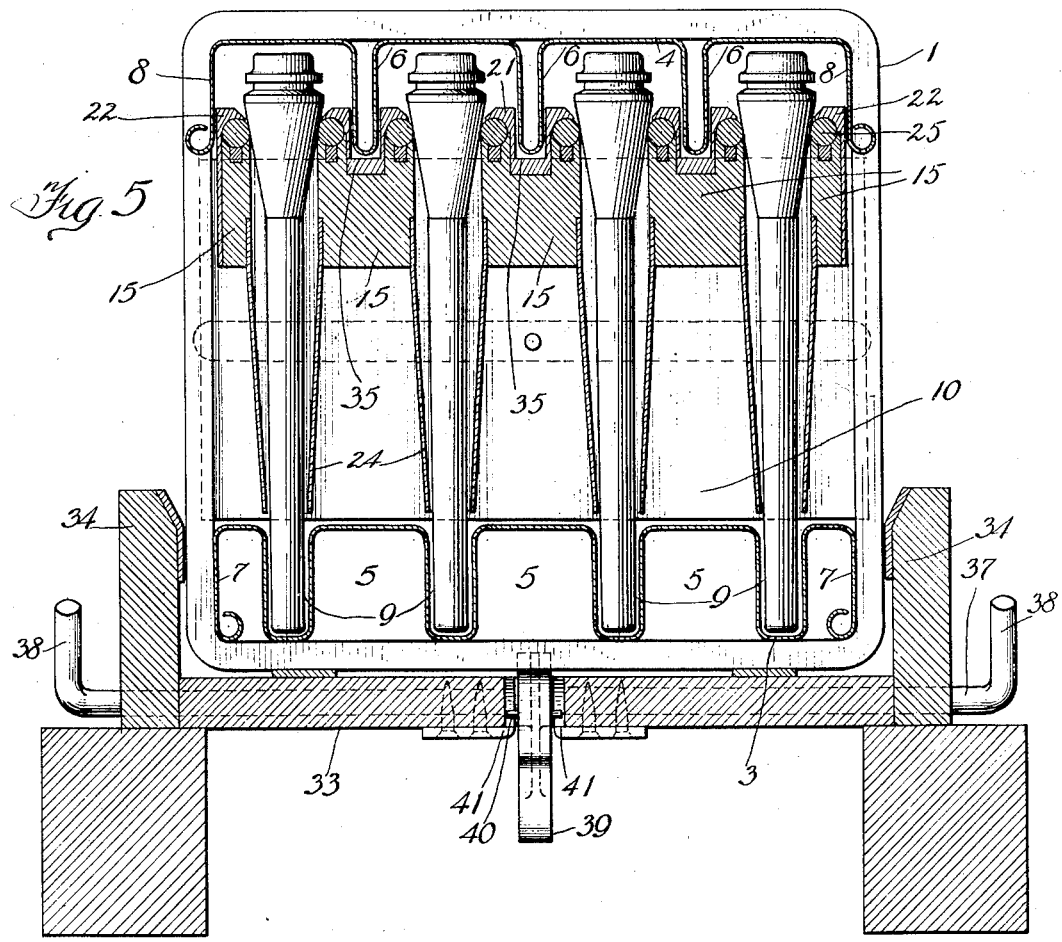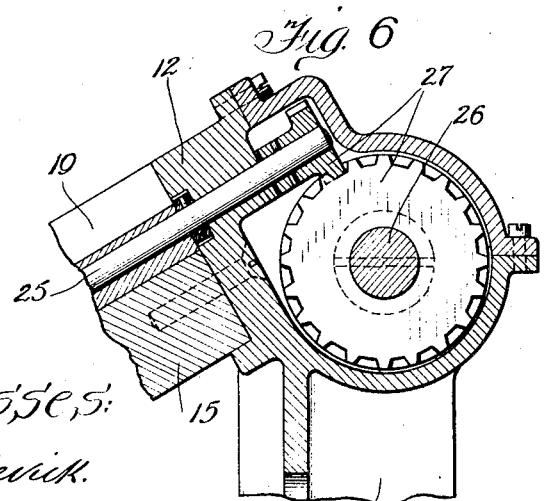

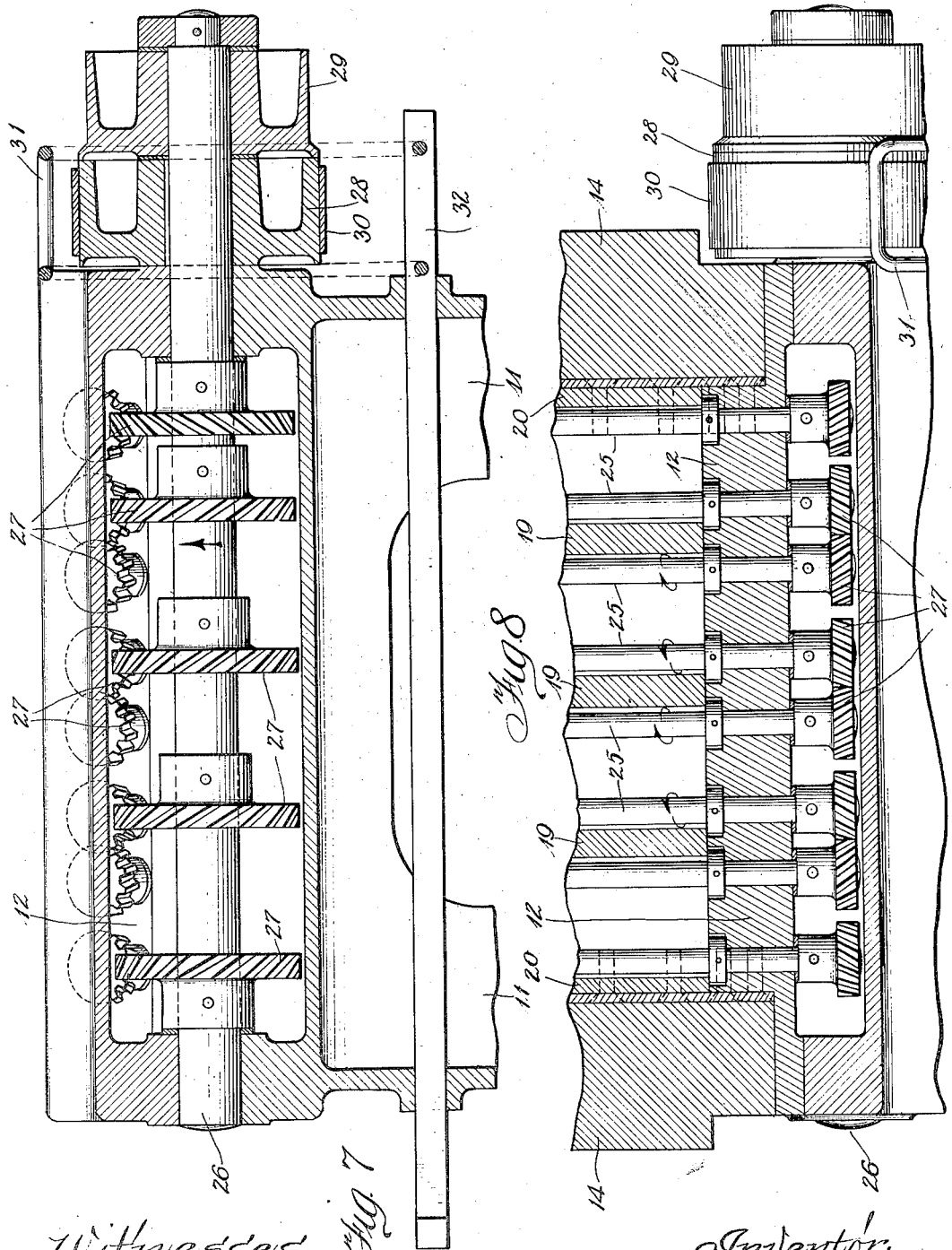

B. A. PETERSON.
BOBBIN HANDLING APPARATUS.
APPLICATION FILED JAN. 6, 1912.
1,063,588.
Patented June 3, 1913.
6 SHEETS—SHEET 6.
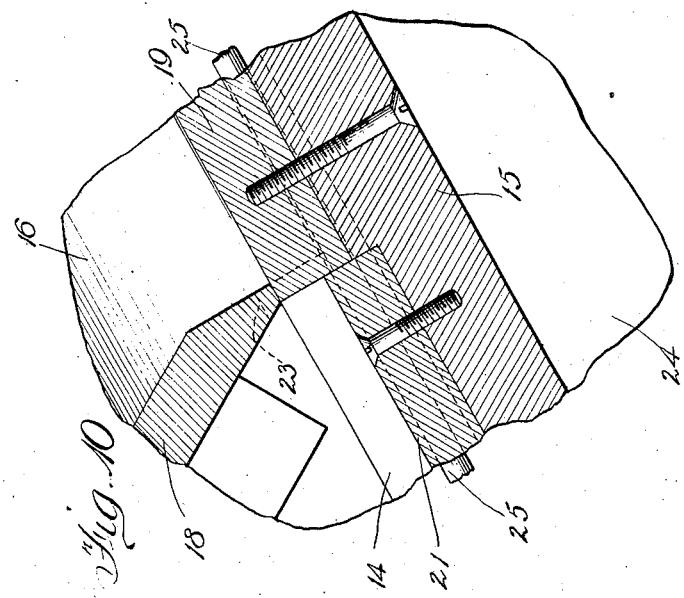
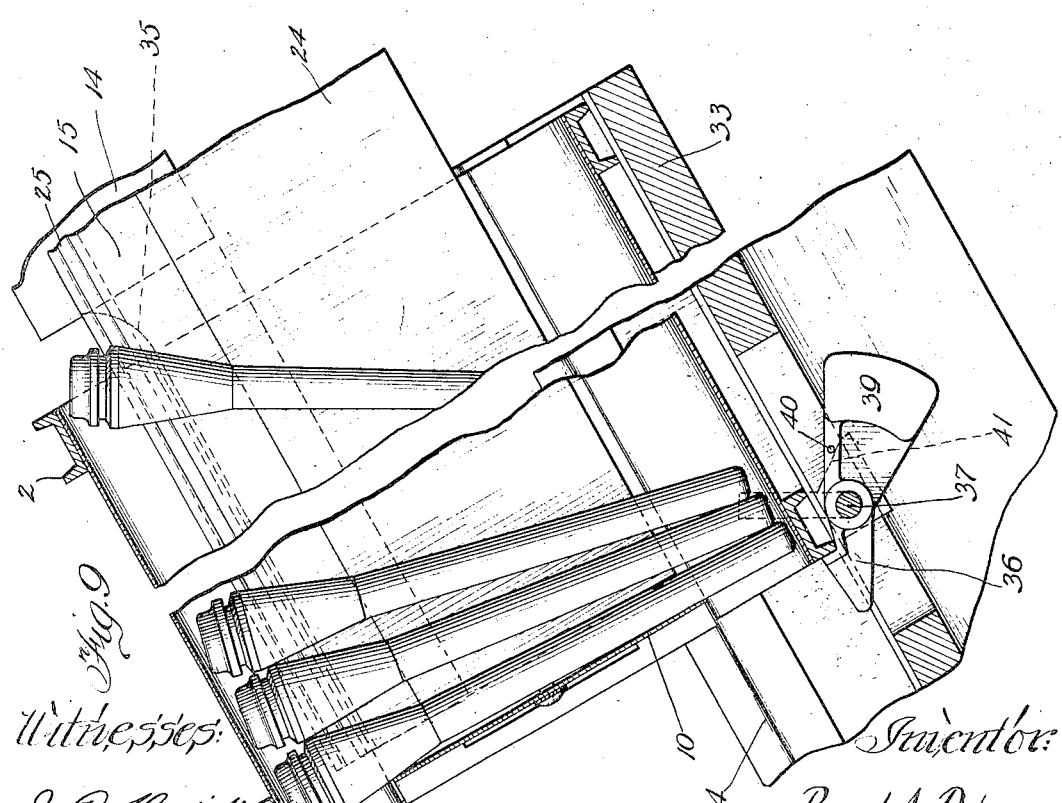
Witnesses:
J. C. Devrik
George L. Chindahl
Inventor:
Burt A. Peterson
Luther L. Miller
Atty.

UNITED STATES PATENT OFFICE.

BURT A. PETERSON, OF ROCKFORD, ILLINOIS, ASSIGNOR TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

BOBBIN-HANDLING APPARATUS.

1,063,588.  Specification of Letters Patent.  Patented June 3, 1913.

Application filed January 6, 1912. Serial No. 669,768.

*To all whom it may concern:*

Be it known that I, BURT A. PETERSON, a citizen of the United States, residing at Rockford, in the county of Winnebago and State of Illinois, have invented certain new and useful Improvements in Bobbin-Handling Apparatus, of which the following is a specification.

The object of this invention is to produce means for sorting a confused mass of bobbins into a desired arrangement and for expeditiously placing the bobbins in orderly arrangement into magazines such, for example, as the magazine used in connection with portable spinning-frame doffers.

In the accompanying drawings, Figure 1 is a side elevation of one embodiment of my invention. Fig. 1ª is a fragmental view of a magazine, showing the arrangement of the bobbins therein. Fig. 2 is a top plan view of the apparatus. Fig. 3 is a sectional view taken in the plane of dotted line 3 3 of Fig. 1. Fig. 4 is a sectional view in the plane of line 4 4 of Fig. 1. Fig. 5 is a section on line 5 5 of Fig. 1. Fig. 6 is a sectional view illustrating the means for driving the rotary rods comprised in the mechanism. Figs. 7 and 8 are sectional views taken in the plane of dotted lines 7 and 8, respectively, of Fig. 1. Fig. 9 is a fragmental sectional view illustrating a means for supporting the magazine during the filling operation. Fig. 10 is a section on line 10 of Fig. 3.

While the invention may be embodied in means for filling various forms of bobbin magazines, the embodiment herein illustrated is especially adapted for loading the character of magazine illustrated in side elevation in Fig. 1 and in transverse section in Fig. 5. As shown in said figures, the magazine comprises two end frames 1 and 2, and two opposite metallic walls 3 and 4 bent to provide partitions 5 and 6, and partial walls 7 and 8. As indicated in Fig. 5, the partitions 5 are so arranged as to form longitudinal grooves 9 wide enough to receive only one bobbin tip, whereby the tips of bobbins placed in the magazine are alined. The partitions 6 are spaced apart a distance considerably greater than the diameter of a bobbin-butt but less than twice the diameter of a bobbin-butt. One end of the magazine is provided with a removable bottom 10 (Fig. 9). As will be understood from Fig. 5, the magazine is adapted to contain four tiers of bobbins arranged with their tips extending in the same general direction.

The embodiment herein shown of my invention is adapted to sort bobbins into four rows, with the tips of the bobbins extending in the same direction, and to feed the rows of bobbins into a magazine.

The supporting framework of the loader may be of any suitable construction, that herein shown including a cast frame consisting of the uprights 11 and the transverse member 12 (Figs. 7 and 8), a bracket 13 (Figs. 1 and 4) of less height than the uprights 11, and two parallel beams 14 each secured to the upper ends of the uprights 11 and the bracket 13. Between the beams 14 are arranged in parallel spaced relation a plurality of bars 15 secured at their upper and lower ends to the transverse member 12 and the bracket 13 respectively, and extending to a point beyond said bracket. The width of the spaces or slots between the bars 15 is greater than the diameter of a bobbin-tip but is not the diameter of a bobbin-butt. Hopper walls 16, 17 and 18 are secured to the upper portions of the beams 14. Members 19 and 20 (Fig. 3) suitably secured in place and extending longitudinally of the bars 15 between the transverse member 12 and the hopper wall 18 have beveled sides leading to the spaces between the bars. Members 21 and 22 (Fig. 4) secured to the bars 15 extend from the hopper wall 18 to the lower ends of the bars 15. In the lower end of the hopper are provided spaces 23 (Fig. 3) alined with the slots between the bars 15 and of sufficient size to permit the passage of a bobbin positioned as indicated in said figure. Guard plates 24 are secured to the bars 15 at opposite sides of the slots between said bars.

Rotatably mounted in grooves formed between the bars 15 and the members 19, 20, 21 and 22 are rolls 25, a portion of the periphery of each roll projecting beyond the parts between which it lies, so as to contact and support bobbins extending through the slots between the bars 15 as indicated in Fig. 3. Bearings for the rolls 25 are provided in the frame-member 12. The rolls 25 may be driven by any suitable means as, for example, a shaft 26 and spiral gearing 27 (Fig. 7).

28 and 29 are tight and loose pulleys on the shaft 26, 30 is a drive belt, and 31 is a belt-shifter fork operated by means of a slidable rod 32.

The rolls 25 are rotated in the directions to cause the portions of their peripheries which are adjacent to the slots between the bars 15 to move upward. As shown in Fig. 9, the rolls 25 extend to the lower ends of the bars 15.

Adjacent to the lower ends of the bars 15 is means for supporting a magazine. The supporting means herein shown, by way of example, comprises a table 33 inclined at the same angle as the series of bars 15 and provided with side rails 34. The table 33 extends up beneath the series of bars 15 sufficiently far to permit of sliding the magazine onto the ends of said bars until the latter are adjacent to the bottom of the magazine. The bars 21 are grooved as at 35 (Fig. 5) to accommodate the partitions 6.

Any suitable means may be employed to releasably hold the magazine in the position indicated in Figs. 1, 2 and 9, as, for instance, a hook or detent 36 fixed upon a suitably supported rock shaft 37 extending transversely of the table 33. The detent 36 is located in position to underlie the end frame 1 of the magazine. When the magazine is to be released, the operator withdraws the detent by rocking the shaft 37 through the medium of the handle-portions 38. A weight 39 normally holds the detent 36 in operative position, this position being determined by a pin 40 (Fig. 5) stopping against suitable fixed parts 41.

In use, an empty magazine is placed upon the table 33, slid up onto the bars 15, and locked in position by means of the detent 36. Motion having been communicated to the drive shaft 26, a quantity of bobbins is placed in the hopper. By reason of the inclination of the bars 15, they tend to slide or roll down to the lowest portion of the hopper, and in doing so the bobbins quickly assume a position in line with the bars, whereupon the tips of the bobbins swing down into the spaces between said bars. The bobbins thus arrange themselves in four rows, in the present embodiment with their tips extending downwardly. When in this position the bobbins rest in contact with the rolls 25, which rolls accelerate the gravitational movement of the bobbins and prevent their binding and sticking between the bars 15. The bobbins thus descend, the foremost ones stopping against the bottom of the magazine, and others stopping against those in front, until the spaces between the bars 15 are completely filled up to a point above the magazine. The operator then releases the detent 36, and, while holding the magazine so as to control its downward movement, he pushes the rows of bobbins down with the magazine. As the bobbins leave the spaces between the bars 15, the butts of the bobbins assume a staggered relation in the spaces between the partitions 6 and side walls 8 (as shown in Fig. 1ª), and thus take up less room longitudinally of the magazine than they did when arranged in single file between the bars 15; therefore, the operator pushes sufficiently long lines of bobbins down with the magazine so that the latter shall be properly filled when clear of the bars 15. When the magazine has been withdrawn from said bars, it is turned into an upright position and set aside, and another magazine put in its place. The downward movement of the bobbins is at such a rate as to permit of thus substituting magazines before any bobbins are discharged from the series of bars 15.

I claim as my invention:

1. In a bobbin-sorter, the combination of two members arranged in parallel relation and spaced apart a distance greater than the diameter of a bobbin-tip and less than the diameter of a bobbin-butt, one of said members being a roll against which the bobbins bear, and means for rotating said roll.

2. In a bobbin-magazine loader, the combination of a plurality of inclined parallel rolls arranged to support between them bobbins extending transversely of the rolls, means for supporting a magazine so as to inclose a portion of the rolls, and means for rotating the rolls.

3. In a bobbin-magazine loader, the combination of a plurality of inclined parallel rolls arranged to support between them bobbins extending transversely of the rolls, means for rotating the rolls, and means for normally supporting a magazine so as to inclose a portion of the rolls, the magazine-supporting means including a table inclined similarly to the rolls and arranged adjacent to the lower ends of said rolls.

4. In a bobbin-sorter, the combination of a set of spaced parallel bars, a hopper-like structure over a portion of said set of bars, and rolls supported by said bars and presenting a portion of their peripheries in the spaces between said bars, said rolls being adapted to support bobbins.

5. In an apparatus of the character described, in combination, an inclined series of spaced parallel bars, a hopper-like structure the bottom of which is constituted of the upper portion of said bars, an inclined table the upper portion of which extends beneath the lower portion of said bars, said lower portion of the bars being adapted to extend within a magazine positioned upon the upper portion of said table, and means for locking a magazine in such position.

6. In an apparatus of the character described, in combination, an inclined series of spaced parallel bars, a hopper-like structure the bottom of which is constituted of the upper portion of said bars, an inclined table the upper portion of which extends beneath the lower portion of said bars, said lower portion of the bars being adapted to extend within a magazine positioned upon the upper portion of said table, and means for locking a magazine in such position, said bars being of such length as to provide a space between the upper end of the magazine and the lower end of the hopper-like structure for the accumulation of sorted bobbins.

In testimony whereof I hereby affix my signature in the presence of two witnesses.

BURT A. PETERSON.

Witnesses:
W. W. R. HEYM,
LOUISE A. CULVER.